US008447085B2

(12) United States Patent
Gloger (10) Patent No.: US 8,447,085 B2
(45) Date of Patent: May 21, 2013

(54) METHOD FOR SEGMENTING AN ORGAN IN VOLUME DATA RECORDS FROM MAGNETIC RESONANCE IMAGING

(75) Inventor: Oliver Gloger, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 260 days.

(21) Appl. No.: 12/860,204

(22) Filed: Aug. 20, 2010

(65) Prior Publication Data

US 2011/0044523 A1 Feb. 24, 2011

(30) Foreign Application Priority Data

Aug. 21, 2009 (DE) .......................... 10 2009 038 436

(51) Int. Cl.
*G06K 9/00* (2006.01)
(52) U.S. Cl.
USPC .......................................................... 382/128
(58) Field of Classification Search
USPC .................... 382/128–132, 154, 173–176
See application file for complete search history.

(56) References Cited

U.S. PATENT DOCUMENTS

| 6,249,594 | B1 * | 6/2001 | Hibbard | 382/128 |
| 7,715,626 | B2 * | 5/2010 | Florin et al. | 382/173 |
| 2004/0218794 | A1 * | 11/2004 | Kao et al. | 382/128 |
| 2006/0239552 | A1 * | 10/2006 | Tu et al. | 382/173 |
| 2008/0080757 | A1 * | 4/2008 | Scheuering et al. | 382/131 |
| 2009/0016591 | A1 * | 1/2009 | Lakare | 382/131 |
| 2011/0044524 | A1 * | 2/2011 | Wang et al. | 382/131 |
| 2011/0116698 | A1 * | 5/2011 | Weis et al. | 382/131 |

FOREIGN PATENT DOCUMENTS

EP 1080449 B1 10/2003

OTHER PUBLICATIONS

K. Cheng et al., "A Novel Shape Prior Based Level Set Method for Liver Segmentation from MR Images", Proc. of the 5th Int. Conf. on Information Technology and Applications in Biomedicine, 2008, pp. 144-147; Others.
R. A. Fisher, "The Statistical Utilization of Multiple Measurements", Ann. Eugenics, vol. 8 (1938), pp. 376-386; Others.

(Continued)

*Primary Examiner* — Neha Patel
(74) *Attorney, Agent, or Firm* — Harness, Dickey & Pierce, P.L.C.

(57) ABSTRACT

A method is disclosed for segmenting an organ, more particularly the liver, in n-channel volume data records from magnetic resonance imaging. In at least one embodiment of the method, probability distributions are generated on the basis of segmentation results from n-channel training data records, which probability distributions specify probabilities of positions of voxels and intensity values, which have been reduced from n-dimensions to one dimension with the aid of discriminant reduction, of voxels in the training data records belonging to the organ. At least one 3D probability data record is then generated from the n-channel volume data records on the basis of the probability distributions, in which 3D probability data record each voxel is assigned a probability of belonging to the organ. A maximum value of the 3D probability data record is set as the start point for the segmentation, and the organ is subsequently segmented on the basis of the 3D probability data record using a region-growing technique. The method allows very reliable fully-automatic segmentation of the organ.

13 Claims, 3 Drawing Sheets

OTHER PUBLICATIONS

D. Zhang et al., "A Comparative Study on Shape Retrieval Using Fourier Descriptors with Different Shape Signatures", Proc. Conf. Intelligent Multimedia and Distance Education, 2001, pp-1-9; Others.

A. Folkers et al., "Content-based Image Retrieval Using Fourier Descriptors on a Logo Database", Proc. of the 16th Int. Conf. on Pattern Recognition, vol. III, Quebec City, Canada, Aug. 2002, pp. 521-524; Others.

Cline, Harvey E. et al: "Three-Dimensional Segmentation of MR Images of the Head Using Probability and Connectivity"; Lippincott-Raven Publishers; Journal of Computer Assisted Tomography, Nov./Dec. 1990, vol. 14, Issue 6; Others; 1990.

Yen-Chieh Ouyang et al: "Independent Component Analysis for MAgnetic Resonance Image Analysis"; EURASIP Journal on Advances in Signal Processing; vol. 2008 (2008), Article ID 780656, doi: 10.1155/2008/780656; Others; 2008.

Charles T. Zahn et al: "Fourier Descriptors for Plane Closed Curves", Transactions on Computers, vol. c-21, No. 3, Mar. 1972, pp. 269-281; Others; 1972.

Rao C.R.: "The Utilization of Multiple Measurements in Problems of Biological Classification"; Journal of the Royal Statical Society, vol. 10, pp. 159-203, 1948; Book; 1948.

C.Platero, P. Gonz?alez, M.C. Tobar, J.M. Poncela, J. Sanguino, G. Asensio, E. Santos: "Automatic method to segment the liver on multi-phase MRI"; Applied Bioengineering (Polytechnical University of Madrid) Radio-diagnostic Service (San Carlos Clinic Hospital;Jan. 11, 2008; Others; 2008.

Gang Chen, Lixu Gu, Member, IEEE, Lijun Dian, and Jianrong Xu: "An Improved Level Set for Liver Segmentation and Perfusion Analysis in MRIs"; IEEE Transactions on Information Technology in Biomedicine, Vol. 13, No. 1, Jan. 2009; pp. 94-103; Others; 2009.

* cited by examiner

METHOD FOR SEGMENTING AN ORGAN IN VOLUME DATA RECORDS FROM MAGNETIC RESONANCE IMAGING

PRIORITY STATEMENT

The present application hereby claims priority under 35 U.S.C. §119 on German patent application number DE 10 2009 038 436.7 filed Aug. 21, 2009, the entire contents of which are hereby incorporated herein by reference.

FIELD

At least one embodiment of the present invention generally relates to a method for segmenting an organ, more particularly the liver, in volume data records from magnetic resonance imaging (MRI). By way of example, the organ volume can be calculated from the result of the three-dimensional segmentation.

BACKGROUND

The field of computed tomography (CT) has disclosed a number of techniques for the three-dimensional segmentation of the liver. However, MR images have a different image quality and generally show other tissue properties than CT images. MR images have less pronounced edge structures, which makes the segmentation more difficult. There are additional complications in the segmentation of MR images as a result of image artifacts and partial volume effects.

Only a few methods have been disclosed to date for the three-dimensional segmentation of the liver from volume data records from magnetic resonance imaging. Thus, for example, K. Cheng et al. "A Novel Shape Prior Based Level Set Method for Liver Segmentation from MR Images", Proc. of the $5^{th}$ Int. Conf. on Information Technology and Applications in Biomedicine, 2008, pages 144 to 147 present a method in which the liver is segmented on the basis of a 3D liver shape model from a single-channel MRI volume data record. However, the three-dimensional shape of the liver varies greatly in reality, and so reliable segmentation using such an approach may cause difficulties. Furthermore, this technique does not allow fully-automatic segmentation of the liver either, the latter being desirable for a plurality of applications. Thus, by way of example, epidemiological questions from modern research should be processed, in which the liver volume of a large number of subjects must be determined from the volume data records. As a result of the large number of data records, such an epidemiological evaluation can hardly be performed using a manual segmentation of the liver due to the high time expenditure.

SUMMARY

In at least one embodiment of the present invention, a method is specified for segmenting an organ, more particularly the liver, in volume data records from magnetic resonance imaging, which method allows fully-automatic segmentation of the organ that is as reliable as possible.

Advantageous refinements of the method can be gathered from the subsequent description and the example embodiment.

Multichannel volume data records from magnetic resonance imaging are used in the proposed method. Here, multichannel volume data records are understood to be volume data records recorded with different MRI-weightings, that is to say e.g. one channel or volume data record with a normal weighting, one channel or volume data record with an antiphase weighting, one channel or volume data record with a water-saturated weighting and one channel or volume data record with a fat-saturated weighting. The proposed method uses the image information from all channels or volume data records with different weightings.

Furthermore, the result of the segmentation of training data records is accessed, which training data records were recorded under the same conditions, that is to say they also have the same number and weighting of volume data records from different subjects. In these training data records, the organ (in the preferred application the liver and preferably the kidney as well) was segmented in advance. Training data records from subjects are preferably used for this, which have a spread that is as large as possible in the position and the shape of the organ to be segmented. Here, the number of segmented training data records should preferably be $\geq 10$. In the case of the liver, training data records of subjects with a normal liver are preferably accessed in the process for segmenting a normal liver, and training data records of subjects with a fatty liver are accessed for segmenting a fatty liver.

In the proposed method of at least one embodiment, these manual segmentation results from the training data records are used to generate probability distributions that specify at least probabilities of positions of voxels and the projected intensity values thereof, which were generated by reducing n-dimensions to one dimension with the aid of discriminant reduction, belonging to the organ. These probabilities can be determined on the basis of histograms representing the distribution of the spatial positions of the voxels belonging to the organ in the training data records and the distribution of the projected intensity values of the voxels belonging to the organ after the discriminant reduction. The discriminant reduction, also known as discriminant analysis, is necessary to be able to generate a probability distribution on the basis of the intensity values from a combination of these different channels or volume data records due to the different channels or volume data records with different weightings. The reduction of the multiplicity of channels, and hence multidimensional data, to one dimension is preferably brought about by applying the linear discriminant reduction technique, also referred to as the Fisher discriminant reduction, as known from the prior art for such problems (see e.g. R. A. Fisher, "The Statistical Utilization of Multiple Measurements", Ann. Eugenics, volume 8 (1938), pages 376 to 386), the entire contents of which are hereby incorporated herein by reference.

At least one 3D probability data record is now generated from the segmented multichannel volume data records, in which 3D probability data record each voxel of this data record is assigned a probability of this voxel belonging to the organ. This assignment is brought about on the basis of the probability distributions from the training data records, i.e. taking into consideration the position thereof in the volume data record and taking into consideration the projected intensity value thereof or the intensity value thereof reduced to one dimension. The projected or reduced intensity value is obtained by projecting the intensity value vector, also referred to as a vector voxel hereinbelow and consisting of n elements, from the n volume data records onto the projection vector, which was calculated when the discriminant reduction was performed using the training data records.

After generating this 3D probability data record, the voxel with the maximum probability value in this data record is used as the start point for the subsequent segmentation. The organ itself is then segmented starting from this start point on the basis of the 3D probability data record by a segmentation using a region-growing technique.

A preferred application of at least one embodiment of the method relates to the segmentation of the liver, which will be considered in more detail in the following description in an example fashion. A multistage segmentation is preferably performed in this case, in which, after a first segmentation pass, there is a refinement at at least one transition between liver and kidney on the basis of known anatomy of liver and kidney in order to reduce or avoid oversegmentation in this region.

All of the aforementioned steps of the proposed method of at least one embodiment, starting with the generation of the probability distributions on the basis of the provided segmentation results from the training data records, can be performed in a fully-automatic fashion and require no manual intervention. Since the results from the training data records can be used for all newly performed MRI recordings that were performed with the same number of channels and the same weighting, at least one embodiment of the proposed method thus can fully automatically segment the organ, more particularly the liver, from all such multichannel MRI volume data records. Hence, the method can be used very advantageously for epidemiological examinations, in which a very large number of MRI volume data records have to be evaluated.

In an advantageous development of at least one embodiment of the method, the respective organ or liver volume can also be calculated and output, or stored in an appropriate database, in a fully-automatic fashion on the basis of the segmentation result. It goes without saying that at least one embodiment of the method can however also be used for different medical problems, more particularly in the case of individual MRI examinations as well, in order to reduce the time expenditure for segmenting the organ. At least one embodiment of the method operates very reliably as a result of using all channels from the MRI volume data and hence using all available image information, using the previous knowledge from the training data records and as a result of using the multistage segmentation.

Thus, at least one embodiment of the proposed method models the previous knowledge, obtained in a training phase and relating to the intensity distributions of the organ or the liver tissue, on all, for example four, MR image channels. Additionally, previous knowledge relating to the three-dimensional organ or liver position in the MRI data records is modeled and combined within the scope of a probabilistic approach together with the previous knowledge relating to the intensity distributions. Applying the linear discriminant reduction can find an optimum projection axis in the four-dimensional space, onto which projection axis the four-dimensional vector voxels from the MR images can be projected whilst maintaining maximum discriminance. By using a Bayesian approach, new MRI data records can be transformed into probability data records by integration with the trained organ or liver position probabilities. Additionally, the maximum of the respective probability data record provides an ideal start point for the segmentation, by way of which start point at least one embodiment of the method can be performed in a fully-automatic fashion.

A preferably three-stage segmentation method of at least one embodiment first of all segments the right liver part in the generated probability data records and subsequently segments the left liver part whilst including the findings relating to the positions of the right liver part. This split can reduce oversegmentation. The segmentation is further refined in a final phase. This can eliminate convex oversegmentation in the transition region between kidney and liver. Curvature having a too high degree of convexity, i.e. curvature lying above a prescribable threshold, is preferably reduced in each transverse slice to the left of the centroid of the liver using a region-shrinking method and the segment boundaries are refined using Fourier descriptors.

At least one embodiment of the method can be used to significantly reduce, or completely dispense with, the complicated segmentation by the radiologist by way of fully-automatic segmentation. This unburdens the radiologist and thereby has a positive influence on the overall progress of a study. The liver volume, preferably determined automatically, is very important for epidemiological and medical-scientific research. Furthermore, a 3D surface model of the liver of a patient can also be generated in individual MRI patient data records by using a fully-automatic 3D liver segmentation. Such surface models represent important additional information and are used with increasing popularity in a targeted fashion for operation planning in liver surgery.

In a refinement of at least one embodiment of the proposed method, the probability distributions comprise so-called 2-class probability distributions. Here, the voxels of the training data records are subdivided by the segmentation into the two classes: liver (L) and background (H). The 2-class probability distributions specify probabilities of positions of voxels and intensity values, which have been projected from n-dimensions to one dimension with the aid of discriminant reduction, of voxels in the training data records belonging to the liver or the background.

An example procedure for determining the 2-class probability distributions, also referred to as LH probability distributions in this case, and subsequently calculating the 3D probability data record for the newly measured MRI data records is explained in more detail hereinbelow on the basis of 4-channel training data records.

For this, a 3-dimensional region of the abdominal region of the subjects used for generating the training data records, which 3-dimensional region has the positions (x, y, z) in respect of a particular coordinate origin, was measured by the MRI scanner. The MRI measurement is undertaken with 4 weightings and so 4 intensities are available for each 3D position (x, y, z). These 4 intensities are combined at each position (x, y, z) of the abdominal region to form a 4-element vector voxel. The result of the segmentation is a collection of vector voxels for the liver and a collection of the vector voxels for the background. In this case with the pure distinction between liver and background, the background comprises everything in the image or volume data record except for the liver, that is to say it also contains the other organs. Additionally, a collection of the x, y, z-positions of the liver and a collection of the x, y, z-positions of the background are obtained. This collecting is carried out over 10 test subjects.

The Fisher discriminant reduction is subsequently performed using this vector voxel collection for liver and background. The result is a 4-element vector (=Fisher projection vector). This is an optimum vector, which as it were represents the direction of the "strongest difference" between the two liver and background classes.

All collected vector voxels of the liver are now projected onto this Fisher projection vector, i.e. the scalar product between each liver vector voxel and the Fisher projection vector is calculated. A scalar projection value emerges for each 4-element liver vector voxel from this projection as a result of the scalar product. A (normed) histogram is calculated from these scalar projection values. This histogram is a probability distribution of the liver vector voxels, which in this case corresponds to a probability distribution also referred to as a liver-tissue probability in the following text. The background vector voxels are projected according to the same principle in order to obtain the corresponding probability distribution, which is also referred to as background-tissue probability in the following text.

These are the tissue probabilities that can be determined with the aid of the 10 MRI training data records. Now, the tissue probabilities should also be determined on the basis thereof for the new MRI data records of new subjects, in which new MRI data records the liver should be segmented. For this, each vector voxel of a new MRI data record is likewise projected onto the Fisher projection axis determined using the training data records. For this projected value, the two probabilities from the histograms or probability distributions are read-out in each case, i.e. firstly the liver-tissue probability which this projected value has and then, correspondingly, the background-tissue probability.

These two probabilities are combined in a Bayesian formulation and determine the significant a posteriori liver probability of each vector voxel of the combined MRI data record of the new subject. This a posteriori probability now specifies the probability of a voxel in a new MRI data record being liver tissue on the basis of its 4 measured intensities.

The liver-position probability can likewise be determined on the basis of a histogram for the collected liver positions of the 10 MRI training data records. No projection is required for this. The liver-position and background-position probabilities can be directly transferred for each position of the new data record by way of the histograms of the two collected liver and background positions (x, y, z). Thus, this probability is fixedly prescribed for each position (x, y, z) in the new data record after the training phase. These position probabilities are likewise included in the above Bayesian formulation in order to use these to calculate tissue probabilities and position probabilities for the liver in an automatic fashion. The maximum of the 3D probability data record for a new subject obtained by the calculation is considered an optimum start point for the subsequent segmentation method.

The voxels of the training data records can likewise be subdivided into the three classes: liver (L), kidney (N) and background (H) (here the background is everything bar liver and kidney) by the segmentation, and 3-class probability distributions can be generated therefrom. This can be performed as an alternative to the above 2-class case (LH case), in which the 3D probability data record is then calculated and the new MRI data record is subsequently segmented on the basis of the 3-class case (LNH case). The kidney tissue and kidney position probabilities are then also integrated into the Bayesian formulation for calculating the 3D probability data record.

However, in the example refinement of at least one embodiment, the 2-class probability distributions are generated in addition to the 3-class probability distributions and an additional 3D probability data record is also calculated on the basis of the 2-class case (LH case). The new MRI data record is then segmented on the basis of the 3D probability data record for the LNH case. The LH case is used for refining the segmentation in the transition region between liver and kidney. This type of combination yields the best results in the case of the fully-automatic segmentation of the liver using the proposed method.

In a development of at least one embodiment of the proposed method, additional segmentation results from the training data are used, in which the left liver part was segmented separately. These segmentation results are then used to generate the probability distributions (position and tissue probability) for the left liver part (liL case) and are applied to the current MRI data record. In the subsequent segmentation, the right or main liver part is then segmented first and the left liver part is subsequently segmented on the basis of the probability distributions for the left liver part.

BRIEF DESCRIPTION OF THE DRAWINGS

Hereinbelow, the proposed method is once again explained in more detail on the basis of an example embodiment in combination with the drawings, in which.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes,"

and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In the example embodiment described below, the MRI volume data records were recorded by a magnetic resonance imaging scanner, which comprised five phased-array surface coils and a coil integrated into the patient couch. A Ti-weighted volume interpolated breath-hold exam (VIBE) sequence was used to record four differently-weighted volume data records, i.e. a four-channel MRI recording was performed. These weightings are a normal weighting (in phase), an antiphase weighting, a water-saturated weighting and a fat-saturated weighting. The individual volume data records are conventionally composed of a multiplicity of transverse slice images.

Figure 1:
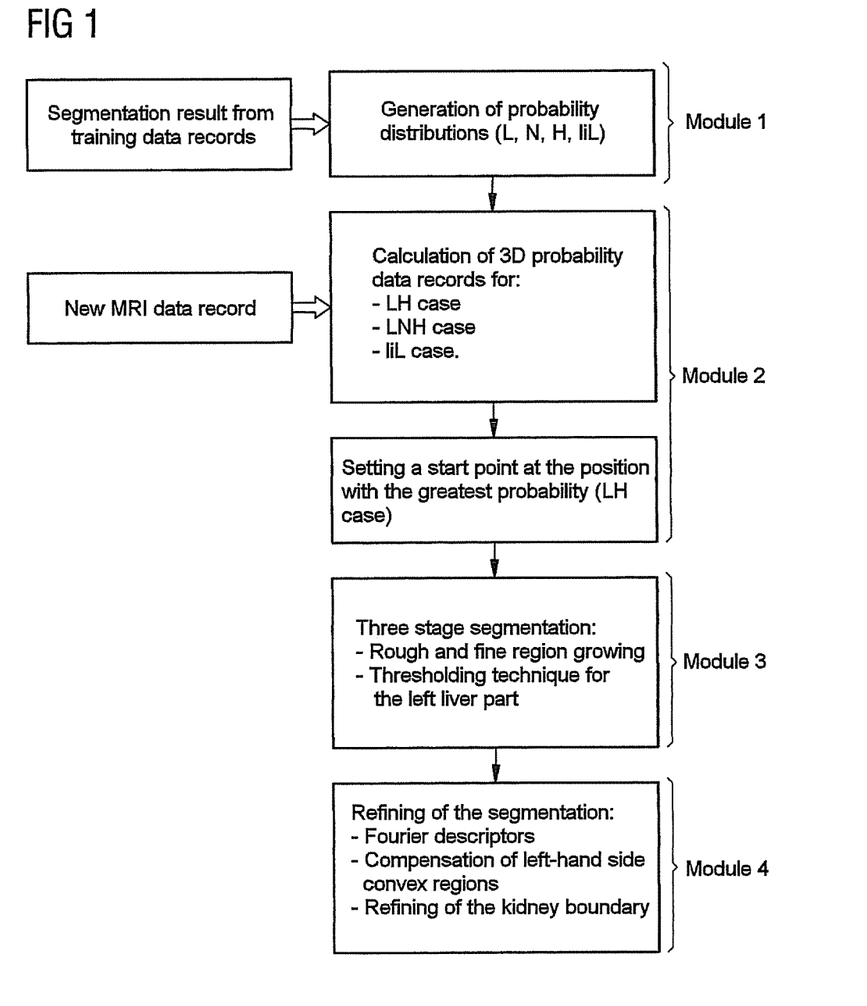
FIG. 1 shows a schematic overview illustration over the individual steps in an embodiment of the proposed method.

The proposed fully-automatic method for liver segmentation is subdivided into a plurality of modules, which can also be recognized in the schematic illustration of FIG. 1. Here, the previous knowledge relating to tissue properties and the previous knowledge relating to the position of the liver, the kidney and the background are used in the first module for generating probability distributions on the basis of segmentation results from training data records. These probability distributions can then be used to prepare the currently to be segmented three-dimensional data records for the subsequent segmentation by means of region growing (second module). Here, the liver is segmented slice-by-slice in a transverse perspective using the known region-growing technique. The segmentation is performed in at least two stages, wherein the main part of the liver, also referred to as the right liver part, is segmented in the first stage and the remaining left liver part is segmented in the second stage. This segmentation is performed in the third module. The segmentation is finally refined in the fourth module in order to reduce possible oversegmentation or errors.

The proposed method utilizes the segmentation result from the training data records. By way of example, these training data records can be segmented by experienced radiologists. In the segmentation, the outline of the liver is segmented manually in this example in ten different training data records, which originate from different subjects with differently shaped livers. The outlines of the kidney are also segmented manually in the same data records. The 4-dimensional or 4-element vector voxels, i.e. the voxels of the four differently weighted volume data records combined to a vector voxel, are classified as liver tissue, kidney tissue and background in the present method on the basis of these segmentation results.

In addition to the entire liver and the kidney, the left liver part was also separately segmented manually in the training data records. This is based on the finding that heterogeneous intensity regions can often be recognized in MR images between the left liver part and the right liver part.

The three-dimensional positions of the liver voxels, the kidney voxels and the background voxels were also determined on the basis of the segmentation results.

In order to avoid oversegmentation, which predominantly occurs in the transition region between the liver and the kidney in the region-growing approach selected in this case, and as a result of occasional intensity inhomogeneities between the left and the right liver part, probability distributions were generated for the following three cases:
  probability distribution for the three classes: liver, kidney and background (LNH case),
  probability distribution for the two classes: liver and background (LH case),
  probability distribution for the two classes: left liver (liL) and background (liLH case).

The position probabilities of the liver, the kidney and the background can be determined separately from three histograms of the voxel coordinate distribution from the training phase in the three orthogonal spatial directions x, y, and z. The position distribution for the voxels of the background is calculated separately in the LNH case and the LH case because the kidney contributes to the background probability in the LH case. These position probabilities are calculated once for each voxel of the three-dimensional volume data record and are stored for subsequent calculations.

The tissue probabilities as per the intensity distributions in the MRI volume data records are determined in the next step. In order to calculate the probabilities for the analyzed liver, kidney and background classes, it is necessary to take into account the intensities in all differently weighted channels. It is for this reason that the higher-dimensional data is reduced to a single dimension. In principle, there are a plurality of techniques for reducing the information from higher-dimensional data. So as to provide a technique that is as fast as possible for the intended epidemiological evaluations, the linear discriminant analysis (LDA) or linear discriminant reduction technique as per Fisher is selected in the present example (see the introduction of the description). In the case of a given n-dimensional statistical model with K classes, the linear discriminant reduction attempts to reduce the dimensionality of the n-dimensional model to d (d<n) dimensions using a linear transformation. The sought-after optimum transformation obtains a maximum of discriminant information in the data records on which it is based. In order to determine this optimum transformation, Fisher's condition must be maximized:

$$J(w) = \operatorname{Trace}\{(WS_W W^T)^{-1}(WS_B W^T)\}$$

W represents the sought-after transformation matrix and $S_W$ and $S_B$ are the inner-class covariance matrix and the inter-class covariance matrix. The inner-class covariance matrix relates to the multidimensional data with the mean values thereof and is given by $$S_W = \sum_{k=1}^{K} \sum_{n \in C_K} (y_n - \mu_k) \cdot (y_n - \mu_k)^T.$$

For our approach, $y_n$ can be considered as a vector voxel of the MRI data record in the specific liver, kidney or background class and $\mu_k$ can be considered the centroid in each class. Furthermore, the inter-class covariance matrix relates to the ratio between the centroids of each class and the mean value $\mu$ of the entire data record in respect of the amount of data $N_k$ in each class:

$$S_B = \sum_{k=1}^{K} N_k (\mu_k - \mu) \cdot (\mu_k - \mu)^T.$$

LDA attempts to maximize the ratio between the inter-class dispersion and the mean value of the inner class dispersion in the lower dimensional space. This is an optimization problem that can be solved by an eigenvalue decomposition of the $S^{-1}{}_W S_W$ matrix. In out approach, we set d=1 and consider the eigenvector with the greatest eigenvalue to be the sought-after projection matrix.

The LDA is performed separately for all three cases (LNH, LH, liLH), and so three different projection axes (LDA axes) or projection vectors are obtained. All vector-valued voxels of the liver, the kidney and the background obtained from the training data records are projected onto these axes, with a distribution of three different classes being obtained in each of the three cases. The probabilities for the projected values are calculated for each distribution with the aid of the histogram analysis. This is used to obtain tissue probabilities of the liver and the background in the LH and liLH cases and the tissue probabilities for the liver, kidney and background in the LNH case. Hence, a total of seven different tissue probabilities are obtained.

At this point the generation of the probability distributions is complete and the process is continued by calculating probabilities from new MRI data records in which the liver should be segmented. For the LNH case, all 4-dimensional vector voxels of a new 4-channel MRI data record are projected onto the discriminant axis (LDA axis) in the LNH case determined above, and the tissue probabilities for liver, kidney and background are assigned as a function of the generated probability distributions for these classes. The same calculations are performed for the 2-class cases (LH and liLH), and so seven probability values are obtained for each vector voxel in a new MRI data record. In order to obtain a reliable a posteriori probability P(L|V), Bayes theorem is applied, which is expressed as follows in the LNH case:

$$P(L|V) = \frac{P(V|L) \cdot P(L)}{P(V|L) \cdot P(L) + P(V|N) \cdot P(N) + P(V|H) \cdot P(H)},$$

wherein H represents the background and V=V(x, y, z) represents the voxel at a particular position in the 3D data record. P(V|L), P(V|N) and P(V|H) represent the determined tissue probabilities after projecting the voxel V(x, y, z) onto the LDA axis in the LNH case. In this approach, the occurrence probabilities of the classes are not further differentiated on the basis of previous knowledge and all a priori probabilities of the three classes are set to be 1. Additionally, the information of the learned positions of the three classes is included in the a posteriori probability as independent probabilities:

$$P(L|V) = \frac{P(V|L) \cdot P_{xyz}(L)}{P(V|L) \cdot P_{xyz}(L) + P(V|N) \cdot P_{xyz}(N) + P(V|H) \cdot P_{xyz}(H)},$$

$$P_{xyz}(L) = P_{xyz}(L|x, y, z) = P(L|x) \cdot P(L|y) \cdot P(L|z).$$

$P_{xyz}(L)$ is the position probability of the liver class at the selected position x, y, z. The position probability of the kidney N and background H classes are defined in the same fashion. As a result of the similar tissue properties, there are a plurality of regions in the MRI data record at which there is a relatively high a posteriori probability for liver tissue. By including the position probabilities, the a posteriori probabilities are concentrated onto the region of the liver.

By including the position probabilities, the maximum of the entire 3D probability data record P(L|V) can be used as a reliable start point for the subsequent region-growing segmentation step. Although the position probabilities likewise raise the probability values in the vicinity of the liver tissue, possible oversegmentation can be avoided by introducing an upper threshold for the signed curvature allowed in each transverse slice. This reduces oversegmentation in the muscles of the diaphragm, into the gall and the spleen. This cannot prevent oversegmentation in the kidney. Hence, the LDA was performed for three classes and the LNH case was introduced in the proposed method. The probability formulation as per Bayes theorem on the basis of the result of the 3-class LDA in many cases allows good separation of liver and kidney in the probability distributions. However, the a posteriori probabilities of the liver can be reduced significantly at locations of high position probabilities of the kidney due to similar tissue and overlaps of position probabilities between liver and kidney, which can lead to undersegmentation. It is for this reason that the results from the LNH and LH calculations are used in combination with additional refinements of the region-growing method, as will be described in more detail below. Probability distributions generated on the basis of the training data records for the left liver part are likewise used for segmenting the left liver part.

The segmentation approach can be subdivided into three steps. In the first step, a fast region-growing algorithm is performed in lower-resolution probability data records. As a result of the higher resolutions in all transverse planes compared to the sagittal and coronary planes, all transverse slices are reduced by a factor of 3 and a fast region growing segmentation step is performed at first. After this rough region-growing step has been completed, the segmentation is performed using a region-growing step on the basis of the unchanged probability data records. In the third step it is then only the left liver part that is segmented in the longitudinal direction of the body using a thresholding technique.

The first region-growing step starts at the automatically determined start point. The conventional three-dimensional region-growing method utilized proceeds iteratively and in each iteration adds to the segmented region those voxels that directly adjoin the previously segmented region and satisfy a predetermined criterion. The type of connection depends on the observed neighborhood of a voxel and can be chosen individually; for example, 26 neighbor connections are the greatest connection possibility in 3D. If no neighboring voxel satisfying the prescribed criterion is found, the algorithm stops. The decision as to whether a neighboring voxel is connected to the segmented region can depend on different properties, which are formulated as Boolean conditions. In the region-growing method used here, a neighboring voxel is added to the segmented region if the probability value thereof is greater than a prescribed threshold.

In the present example, a layered two-dimensional region-growing method was used, which only allows a single expansion into neighboring transverse slices. This type of connection can be categorized as 8(+2). In the lowest transverse plane of the segmented region, the method searches for the probability maximum within a region delimited by the projection of the segmented region in the lowest plane and said method determines whether this maximum is greater than a probability threshold. The same check is performed for the highest transverse plane of the segmented region. This can ensure that a region only expands into neighboring transverse slices at one position. This assists in avoiding possible oversegmentation. In connection with the avoidance of strong signed curvature, this type of region growing maintains a high degree of connectivity between the voxels of the region and effectively contributes to reducing oversegmentation. The signed curvature can be calculated in each transverse plane by means of the change in normal vector of the current region boundary. The sign of the curvature can be determined by means of the direction of the vector from the cross product of two successive normal vectors on the region boundary.

Due to the left liver part splitting off from the right liver part (main liver part) in the longitudinal perspective, regions of the left liver part remain that cannot be segmented with the above conservative region-growing method. It is for this reason that an additional segmentation step is required for the left liver regions in this case. Probability distributions for the left liver part were generated because of the possible intensity inhomogeneities between the left and the right liver part. As a result of the three-dimensional anatomical structure, all liver shapes show a similar split characteristic, which can be observed in successive transverse slices in a longitudinal perspective. The transverse liver region grows until it reaches a maximum and thereafter it shrinks continuously. The left liver part splits off in the longitudinal direction between one or more slices in the central part of the liver. The left liver part splitting off leads to a reduction in the main liver part between two transverse slices. A lower boundary value for this subdivision or splitting can for example be determined empirically by the preceding analysis of a multiplicity of MRI data records. This empirically determined lower boundary value for the left liver part splitting off, together with the probability distributions for the liLH case and knowledge about the previously segmented main liver part can be used in order to identify all left liver split offs. It is known that the split takes place within the boundaries of the segmented main liver part in two successive transverse slices and takes into account knowledge relating to the segmented main liver part as follows: The result of the region-growing method results in three-dimensional binary regions for the segmented main liver part. Starting with the main liver region of the uppermost transverse slice, the respectively preceding binary region is subtracted from the subsequent binary region and the difference region is determined. These difference regions have integer values in the interval [−1, 1]. Values of 1 indicate possible splitting regions for the left liver splitting off.

In each difference region that exceeds the empirically determined lower boundary value, a threshold segmentation is performed on the basis of the probability distributions for the liLH case. For the purpose of simplification, the same optimum threshold is used that was also used for the main liver segmentation. Due to the anatomy of the liver, the left liver regions continuously reduce in the longitudinal direction. For each identified splitting-off region of the left liver, a layered thresholding technique is used in the longitudinal direction by using the region of the threshold result of the preceding slice as a regional boundary for the threshold segmentation of the current slice. This can effectively avoid oversegmentation. When no region that satisfies the condition of the threshold or the lower boundary value for the splitting off remains, the segmentation of the left liver part is stopped.

Figure 2:
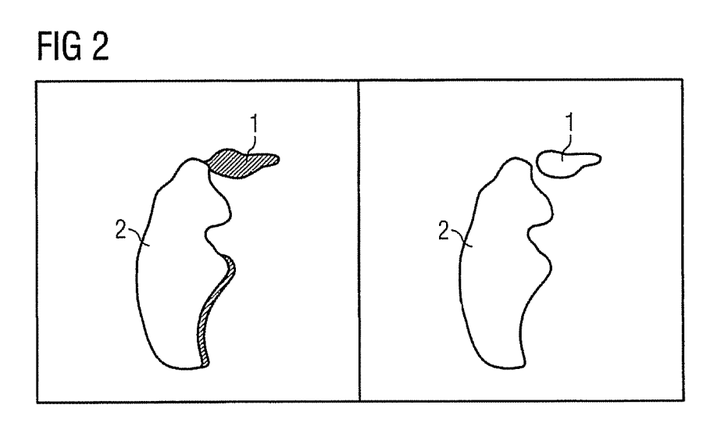
FIG. 2 shows an illustration of the right and left liver part in a transverse MRI slice image.

In the left part, FIG. 2 shows a difference image between the liver regions of two successive transverse slices. The shaded regions show possible regions for a split of the left liver part 1 from the right liver part 2. In the right-hand image, the split of the left liver according to a thresholding segmentation technique was correctly recognized in the probability data record of the liLH case.

As a result of similar tissue properties in regions adjoining the liver, it is very difficult to avoid oversegmentation in general. The highest probability of oversegmentation in the method proposed here is found in the region of the kidney and in a few muscle regions directly adjoining the liver. Muscle regions belonging to the diaphragm are mainly discussed in this example. Hereinbelow, particular refinements of the proposed method are described that avoid such oversegmentation in the adjoining muscle regions and in the kidney as far as possible. Moreover, the technique of Fourier descriptors, which is first of all described in more detail below, was used for smoothing the segmentation boundaries. This technique also avoids extreme curvature of the segmentation boundary.

The liver has a smooth surface without sharp edges or corners. It is for this reason that the segmented liver boundaries are smoothed in a refinement of the proposed method in order to avoid high-frequency components in the boundary profile. For this, use is made of the technique of Fourier descriptors, which constitutes a very fast method for removing high-frequency components in the boundary profile. By way of example, the technique of Fourier descriptors is described in D. Zhang et al., "A Comparative Study on Shape Retrieval Using Fourier Descriptors with Different Shape Signatures", Proc. Conf. Intelligent Multimedia and Distance Education, pp. 1-9, 2001 or in A Folkers et al., "Content-based Image Retrieval Using Fourier Descriptors on a Logo Database", Proc of the 16th Int. Conf. on Pattern Recognition, volume III, pp. 521-524, Quebec City, Canada, August 2002, the entire contents of each of which are hereby incorporated herein by reference. This smoothing also simplifies the subsequently described curvature-dependent calculations.

In order to use the technique of Fourier descriptors, the two-dimensional discrete coordinates of the segmentation boundaries have to be considered in the complex plane. The n discrete coordinates $x(n)=(x_1(n), x_2(n))$ of the boundary have to be ordered in the clockwise or anticlockwise direction and integrated into the complex plane. This leads to a discrete complex function $u(n)=x_1(n)+j \cdot x_2(n)$. The discrete Fourier transform of this complex function determines the Fourier descriptors $a(k)$ at the boundary:

$$a(k) = \frac{1}{N} \cdot \sum_{n=0}^{N-1} u(n) \cdot \exp\left(-\frac{2\pi j k n}{N}\right); \text{ with } k = -\frac{N}{2}, K\frac{N}{2} - 1,$$

wherein N refers to the number of boundary points. The sizes of the Fourier descriptors contribute proportionally to the frequency content in the boundary. That is why relatively high frequencies in the boundary can be suppressed by a low-pass filter or by only using the low Fourier descriptors for the inverse Fourier transform. In this case the first twenty to thirty Fourier descriptors suffice for reproducing the shape.

Left-hand side convex regions of the boundary profile are compensated for in order to avoid oversegmentation in muscle regions. The left-hand side part of the three-dimensional liver surface exhibits a smooth boundary without strong variations in the local curvature. This anatomical condition causes left-hand side boundaries of the main liver part to have only low convex two-dimensional curvature in the two-dimensional transverse slices. Oversegmentation in the left-hand side muscle regions has a significantly more convex profile, which can be registered by the signed average curvature of the boundary. The curvature at a boundary position is determined by the derivative of its normal. The derivative of the normal can be approximated by the change in the normal $\vec{n1}$ and $\vec{n2}$ of two adjoining discrete boundary positions. The change in the normal can easily be registered by the angle between the observed normal vectors and is given by $$\alpha = \arccos\left(\frac{\vec{n1} \cdot \vec{n2}}{|\vec{n1}| \cdot |\vec{n2}|}\right).$$

Therefore all curvature values lie in the interval $[0, \pi]$. The change in the normal between all pairs of equally spaced apart boundary positions within a certain neighborhood is taken into account and the mean value of this change is determined as the mean curvature at the current boundary position. The calculation integrates the curvature in the neighborhood and prevents local curvature extremas. The sign of the curvature can be used to distinguish changes in the normal in convex parts of the boundary from those in the concave parts of the boundary. The sign of the curvature can easily be determined by the sign of the orthogonal contribution of the cross-product vector between the observed normal vectors $\vec{n1}$ and $\vec{n2}$.

Figure 3:
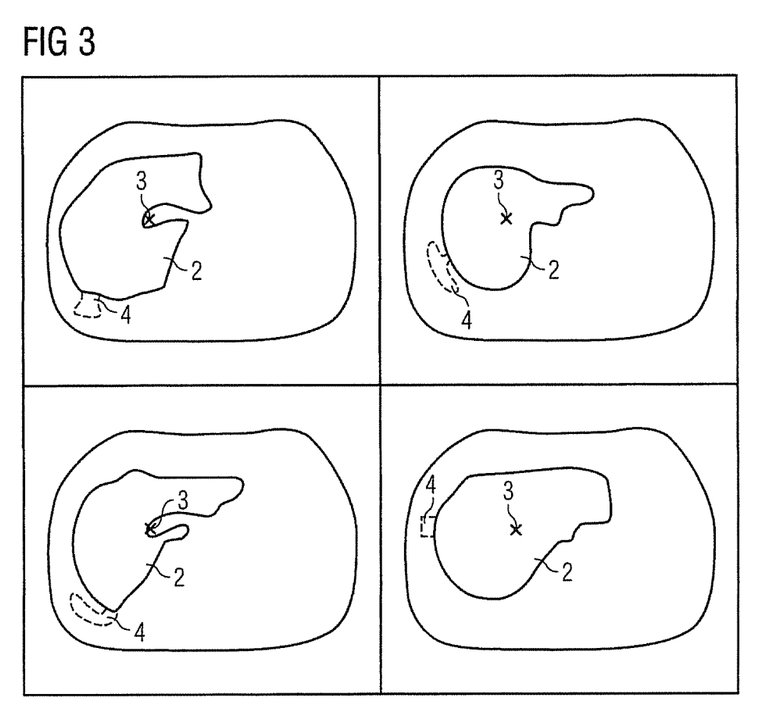
FIG. 3 shows an example for reducing convex oversegmentation.

Hereinbelow, all boundary positions of the main liver part 2, which are situated to the left of the centroid 3 of the segmented region, are referred to as left boundary positions. The left-hand side convex profiles are smoothed using a region-shrinking method, which reduces these convex profiles until the signed curvature thereof lies below a prescribable threshold. The region-shrinking method effectively reduces the convex regions and improves the segmentation result in each transverse slice of the MRI data record. FIG. 3 shows examples of such convex regions 4 (dashed) that are generated by oversegmentation in the muscle regions, and the result of the region-shrinking technique (solid line). The centroid 3 is indicated by the cross. A threshold of 0.8, found empirically, was set here as a boundary value for the convex curvature. Since the liver regions continuously decrease in the lower transverse slices, the curvature of the boundary line thereof also increases. The selected threshold must take this fact into consideration and therefore must be considered as an upper threshold for reducing the convex curvature.

A plurality of subjects show no pronounced boundaries between the liver and the kidney regions in the MRI data records. Oversegmentation into the kidney region can easily occur in this region due to similar tissue properties. In order to avoid this oversegmentation, the 3-class LDA was performed in the present method in order to be able to distinguish between liver, kidney and background tissue, and the resulting tissue probabilities are combined with the position probabilities, resulting in the LNH case. The kidney regions are effectively suppressed in the LNH probability distributions, with, however, some liver regions likewise being suppressed in a few cases. It is for this reason that undertaking the segmentation on the basis of the LNH probability distributions avoids oversegmentation in kidney regions but it cannot guarantee that the liver regions are correctly delimited from the kidney regions. It is for this reason that, in the present method, the region-growing segmentation is also performed on the basis of LH probability distributions, and an investigation is performed as to whether oversegmentation in the kidney region occurs. This examination and the further refinement of the segmentation can be performed with the aid of a difference data record between the LH probability data record and the LNH probability data record.

The resulting difference data record exhibits high probability values in the kidney regions. In the case of overlapping kidney and liver tissues, it also exhibits relatively high probability values in the transition region. Anatomical observations have shown that significant concave regions in the transition region between liver and kidney indicate a separation between liver and kidney. These concave regions can be identified in the segmented boundary line with the aid of the negative curvature. The higher probabilities in the transverse slices of the difference data record represent a mask for the transition regions between kidney and liver and determine at which location the negative curvature must be considered in the boundary line. A separation line between the boundary positions in the transition region with the strongest concave curvature is used for the correct separation between these two organs.

Figure 4:
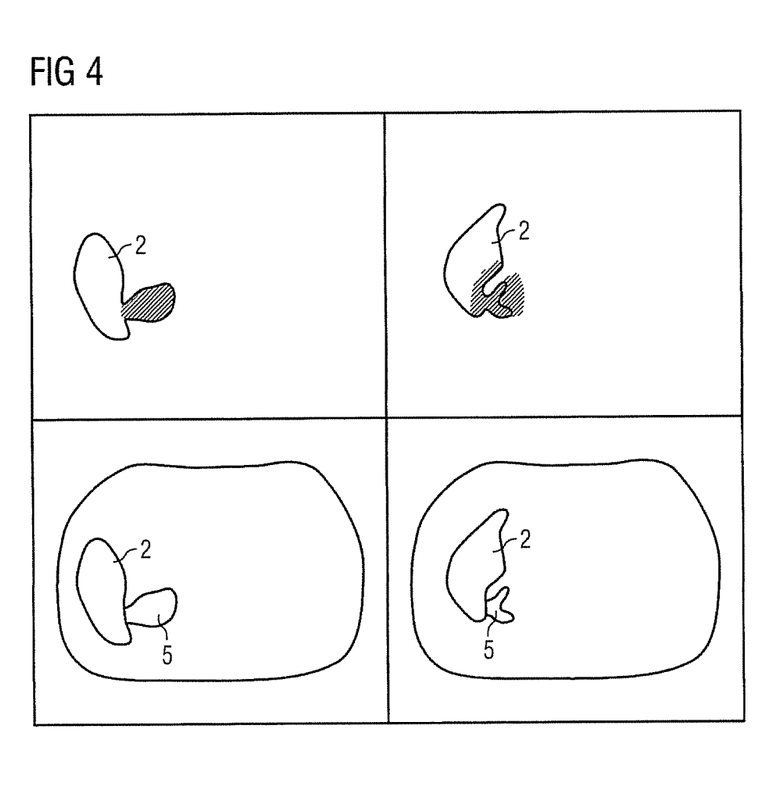
FIG. 4 shows an example of the compensation of oversegmentation in the kidney region.

MYNA To this end, FIG. 4 shows in the upper partial image examples of the transverse slices of the difference data record, in which high probability values are shaded and the previous segmentation boundary can be recognized as a solid line. The lower partial image shows the resultant separation lines that then reproduce the correct boundary to the kidney 5.

Hence, the proposed method uses previous knowledge relating to liver intensity distributions in a targeted fashion in order to determine tissue probabilities in MR images. These tissue probabilities are combined with learned position probabilities in order to generate probability images. Contrary to the existing segmentation approaches, the segmentation is not performed in a selected channel in this case, but in the three-dimensional probability data records that contain image information from all MRI channels. The method provides, on the basis of the calculated probabilities resulting from the tissue and position probabilities, an optimum start point for the liver segmentation. Hence, the method can be performed fully automatically and no longer requires interaction with the medical practitioner. By using a conservative region-growing method in one refinement of the proposed method, oversegmentation in other organ regions with similar probabilities is successfully reduced. Known segmentation methods segment the liver as a volume unit and are therefore not forced to perform the liver segmentation separately for a plurality of liver regions. In the present refinement, the liver is—due to the conservative segmentation method—split into two volume units (left-hand and right-hand liver) and segmented sequentially.

In order to avoid oversegmentation in the region of the kidney, both a 3-class discriminant reduction for the liver, kidney and background and a 2-class discriminant reduction for liver and background are performed, from which probability data records are calculated, the difference of which allows the determination of the transition region between liver and kidney. By connecting conspicuously concave curves within these transition regions, it is possible for convex oversegmentation in the kidney region to be severed. The method can thus distinguish whether there actually was an oversegmentation in the kidney region and only performs the split off in such a case.

By taking into account the signed curvature in the transverse slices within the region-growing method or region-shrinking method, significant convex oversegmentation in the region of the diaphragm is reduced.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for segmenting an organ in n-channel volume data records from magnetic resonance imaging, wherein $n \geq 2$, the method comprising:

generating probability distributions on the basis of segmentation results from n-channel training data records, the probability distributions specifying at least probabilities of positions of voxels and intensity values, which have been reduced from n-dimensions to one dimension with the aid of discriminant reduction, of voxels in the training data records belonging to the organ;

generating at least one 3D probability data record from the n-channel volume data records on the basis of the probability distributions, wherein in the generated at least one 3D probability data record, each voxel is assigned a probability of belonging to the organ;

setting a maximum value of the at least one 3D probability data record as a start point for the segmentation; and segmenting the organ on the basis of the at least one 3D probability data record using a region-growing technique, wherein a multistage segmentation of a liver, as the organ, is performed, wherein, after a first segmentation pass, there at least is a refinement at a transition between the liver and a kidney on the basis of a known anatomy of liver and the kidney in order to reduce or avoid oversegmentation in this region, and wherein the probability distributions comprise 3-class probability distributions that specify probabilities of positions of voxels and intensity values, which have been reduced from n-dimensions to one dimension with the aid of discriminant reduction, of voxels in the training data records belonging to the liver, the kidney or the background, and wherein at least the following are performed for determining the 3-class probabilities:

providing segmentation results that comprise n-dimensional vector voxels of the liver, n-dimensional vector voxels of the kidney and n-dimensional vector voxels of the background;

performing linear discriminant reduction such that an n-dimensional first projection vector is obtained;

projecting the vector voxels of the liver onto the first projection vector in order to obtain first intensity values reduced to one dimension of the voxels of the liver;

projecting the vector voxels of the kidney onto the first projection vector in order to obtain first intensity values reduced to one dimension of the voxels of the kidney;

projecting the vector voxels of the background onto the first projection vector in order to obtain first intensity values reduced to one dimension of the voxels of the background; and calculating the 3-class probability distributions from the first intensity values reduced to one dimension.

2. The method as claimed in claim 1, wherein n-channel vector voxels of the volume data records are projected onto the first projection vector in order to obtain intensity values reduced to one dimension, from which intensity values the 3D probability data record is then generated on the basis of the 3-class probability distributions, by which 3D probability data record each voxel is assigned a probability of belonging to the liver or to the background.

3. The method as claimed in claim 2, wherein the probability distributions comprise 2-class probability distributions that specify probabilities of positions of voxels and intensity values, which have been reduced from n-dimensions to one dimension with the aid of discriminant reduction, of voxels in the training data records belonging to the liver or the background, wherein at least the following are performed for determining the 2-class probability distributions:

providing segmentation results that comprise n-dimensional vector voxels of the liver and n-dimensional vector voxels of the background;

performing linear discriminant reduction such that a second n-dimensional projection vector is obtained;

projecting the vector voxels of the liver onto the second projection vector in order to obtain second intensity values reduced to one dimension of the voxels of the liver;

projecting the vector voxels of the background onto the second projection vector in order to obtain second intensity values reduced to one dimension of the voxels of the background; and calculating the 2-class probability distributions from the second intensity values reduced to one dimension.

4. The method as claimed in claim 1, wherein the probability distributions during a segmentation of the liver, as the organ, additionally comprise probability distributions for a left liver part, which specify the probabilities of positions of voxels and intensity values, which have been reduced from n-dimensions to one dimension with the aid of discriminant reduction, of voxels in the training data records belonging to the left liver part or to the background.

5. The method as claimed in claim 4, wherein a right liver part is firstly segmented in the segmentation and the left liver part is subsequently segmented on the basis of the probability distributions for the left liver part.

6. The method as claimed in claim 1, wherein there is a further refinement after segmenting the liver by reducing convex curves exceeding a threshold using a region-shrinking method in each transverse slice of the 3D probability data record on the left-hand side of a centroid of the liver.

7. The method as claimed in claim 1, wherein Fourier descriptors are used to refine segment boundaries after the organ has been segmented.

8. The method as claimed in claim 1, wherein the 3D probability data records are generated by applying Bayes theorem.

9. The method as claimed in claim 1, wherein there is an automatic calculation and output of the organ volume on the basis of the segmentation of the organ.

10. The method as claimed in claim 1, wherein training data records for fatty livers are used as segmentation results from n-channel training data records in the segmentation of a fatty liver as the organ.

11. A method for segmenting an organ in n-channel volume data records from magnetic resonance imaging, wherein $n \geq 2$, the method comprising:

generating probability distributions on the basis of segmentation results from n-channel training data records, the probability distributions specifying at least probabilities of positions of voxels and intensity values, which have been reduced from n-dimensions to one dimension with the aid of discriminant reduction, of voxels in the training data records belonging to the organ;

generating at least one 3D probability data record from the n-channel volume data records on the basis of the probability distributions, wherein in the generated at least one 3D probability data record, each voxel is assigned a probability of belonging to the organ;

setting a maximum value of the at least one 3D probability data record as a start point for the segmentation; and segmenting the organ on the basis of the at least one 3D probability data record using a region-growing technique, wherein a multistage segmentation of a liver, as the organ, is performed, wherein, after a first segmentation pass, there at least is a refinement at a transition between the liver and a kidney on the basis of a known anatomy of liver and kidney in order to reduce or avoid oversegmentation in this region, and wherein the probability distributions comprise 2-class probability distributions that specify probabilities of positions of voxels and intensity values, which have been reduced from n-dimensions to one dimension with the aid of discriminant reduction, of voxels in the training data records belonging to the liver or a background, wherein at least the following are performed for determining the 2-class probability distributions:

providing segmentation results that comprise n-dimensional vector voxels of the liver and n-dimensional vector voxels of the background;

performing linear discriminant reduction such that a second n-dimensional projection vector is obtained;

projecting the vector voxels of the liver onto the second projection vector in order to obtain second intensity values reduced to one dimension of the voxels of the liver;

projecting the vector voxels of the background onto the second projection vector in order to obtain second intensity values reduced to one dimension of the voxels of the background; and calculating the 2-class probability distributions from the second intensity values reduced to one dimension.

12. The method as claimed in claim 11, wherein n-channel vector voxels of the volume data records are projected onto the second projection vector in order to obtain intensity values reduced to one dimension, from which intensity values the or an additional 3D probability data record is then generated on the basis of the 2-class probability distributions, by means of which 3D probability data record each voxel is assigned a probability of belonging to the liver, to the kidney or to the background.

13. The method as claimed in claim 12, wherein a difference data record between the 3D probability data record and the further 3D probability data record is generated for refining the segmentation, which difference data record serves as a mask for refining the segmentation in the transition region between liver and kidney, wherein concave curves in the transition region of a boundary of the liver obtained in the first segmentation pass are then connected in order to remove convex oversegmentation in the kidney.

* * * * *